Nov. 22, 1932.                    W. R. WILEY                    1,888,252
                                  HOOD CATCH
                        Filed May 18, 1931    4 Sheets-Sheet 1
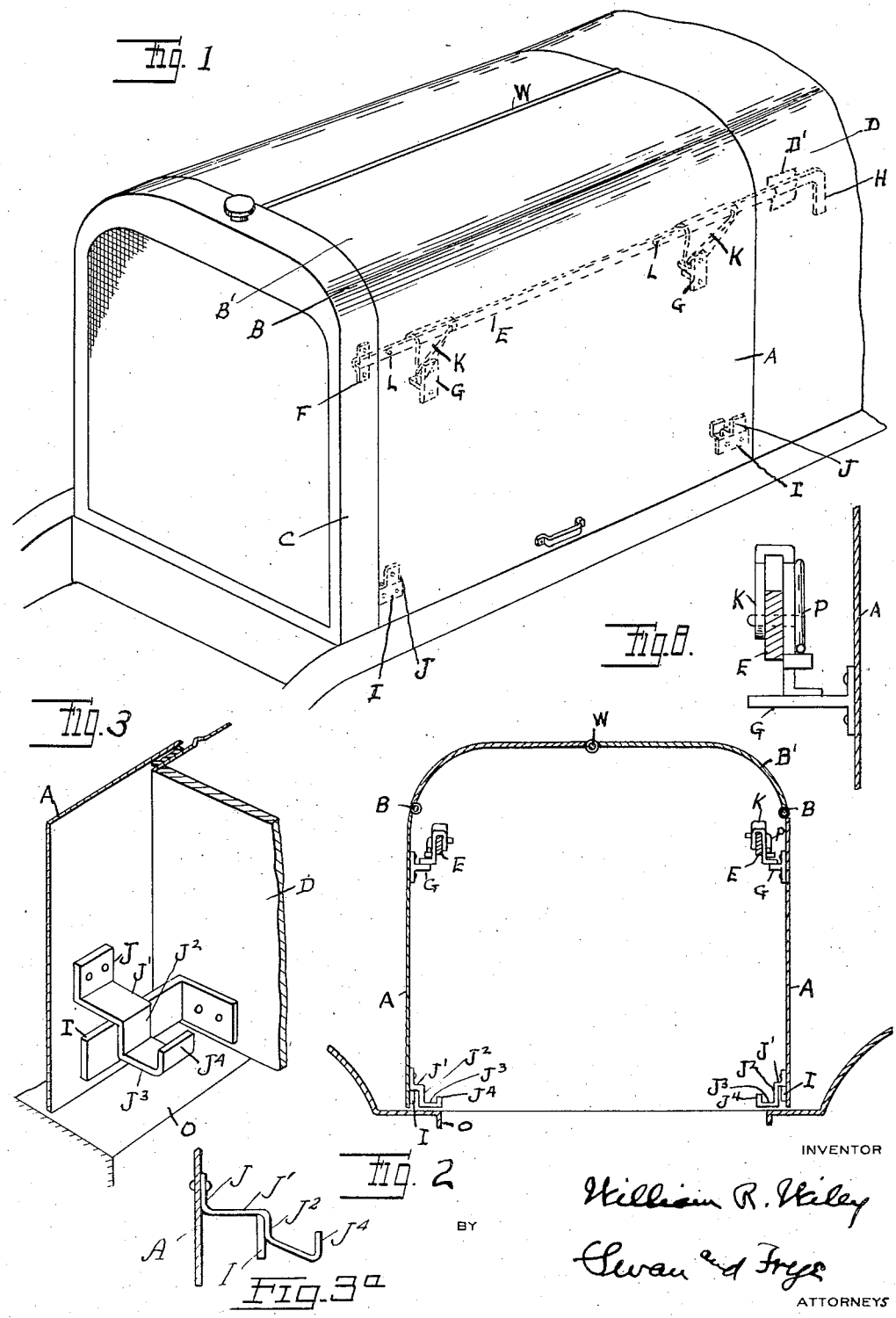

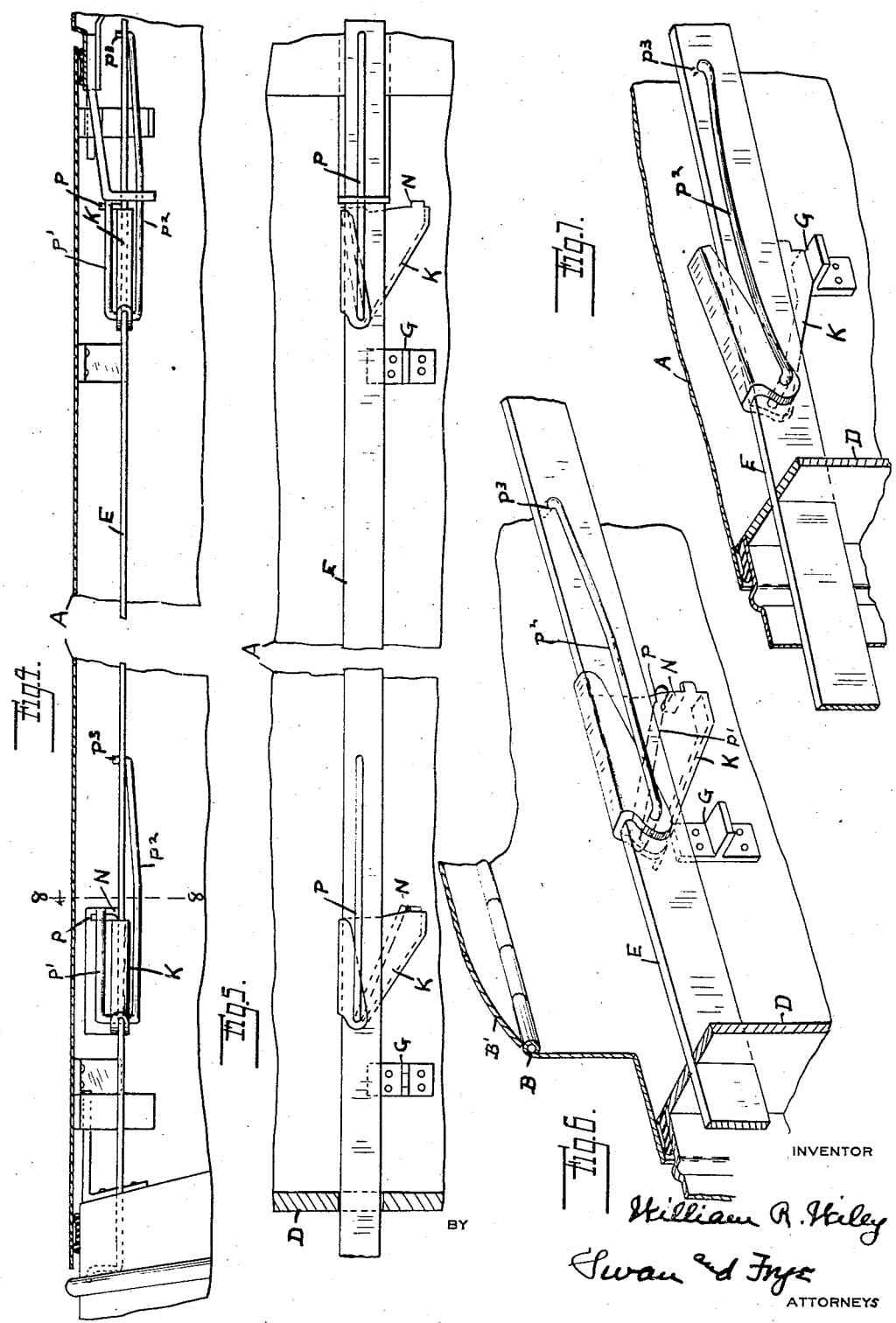

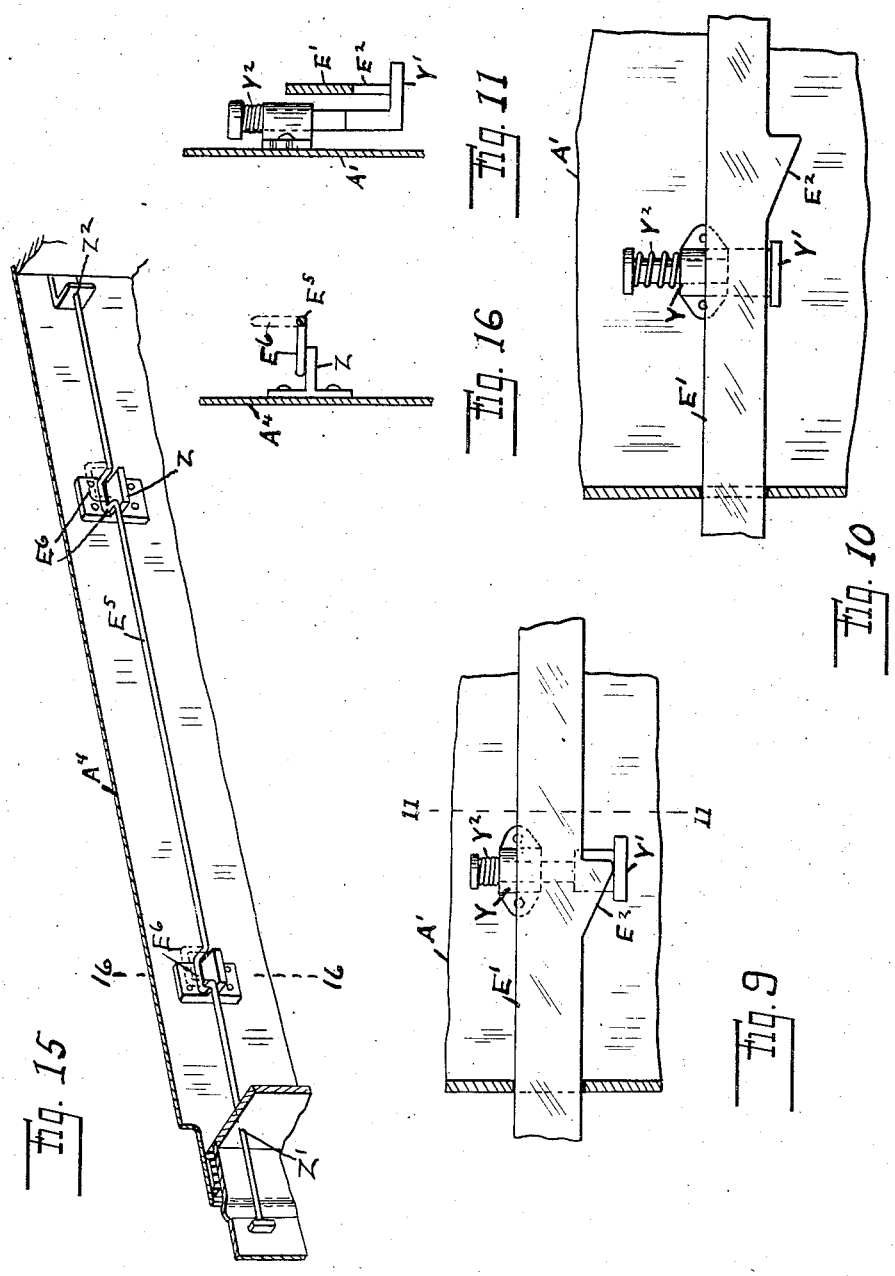

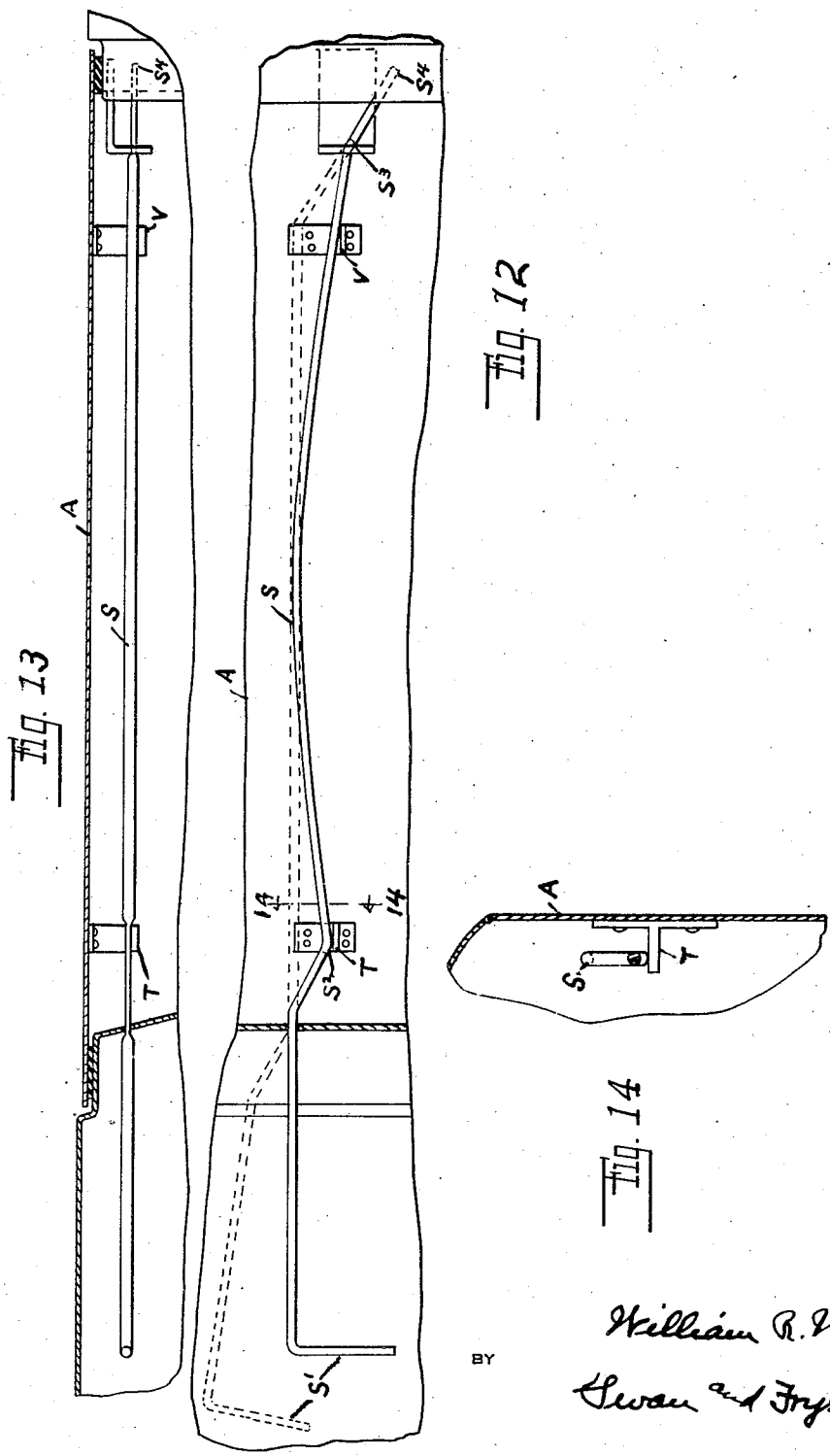

Patented Nov. 22, 1932

1,888,252

UNITED STATES PATENT OFFICE

WILLIAM R. WILEY, OF DETROIT, MICHIGAN, ASSIGNOR TO THE BASSICK COMPANY, OF BRIDGEPORT, CONNECTICUT, A CORPORATION OF CONNECTICUT

HOOD CATCH

Application filed May 18, 1931. Serial No. 538,124.

This invention relates to an improved hood fastening construction for motor vehicles, and has for its object a novel, useful, and relatively inexpensive organization of parts by means of which the hinged liftable hood wall, which overarches and extends protectively outside of each side of the engine as ordinarily positioned in a motor vehicle, may be easily and quickly locked against unauthorized access to the interior of the hood-enclosed space, and unlocked for authorized access and repair purposes, both being controllable from a position interiorly of the car body, so that if this latter be a sedan whose windows and doors may be locked when the occupant so desires, access to the hood-locking mechanism is similarly made dependent upon authorized access to the interior of the car body itself.

In addition to the increasingly recognized advantages of a hood lock whose operative parts are on the inside of the hood wall, such as the more or less unsightly appearance of externally manipulable hook catches now so frequently encountered, and the cost, both initial and installation, which the equipment of the car with four such contrivances involves, my improved construction efficiently meets the objection to such forms of latches, due to the fact that when it is installed and connected against the lower edge of the hood wall, the hinged upper edge of the latter, at about what might be termed the shoulder of the hood wall as a whole, as well as the free lower edge of the hood wall, is firmly held against rattling. A further objection to other so-called inside hood fasteners of which I am aware is that while theoretically feasible, and perhaps satisfactory operable if sized and adjusted accurately, and at correspondingly heavy labor expense as to each car, when these same constructions are applied to cars produced in quantity, sufficient fraction-of-an-inch variations in the size and spaces between the parts of the individual frames, negligible in themselves as regards the car frame as a whole, are encountered in the ordinary run of production, to the degree that while one car might be of such dimensions that a standard locking mechanism would fit the hood wall parts accurately and hold them firmly against rattling, the next four or five would not meet with the nicety and accuracy required for the satisfactory operation of a hood catch, resulting in either a prohibitive degree of binding of the parts or else in such loose interengagement that the whole hood fastener mechanism as such would operatively amount to little or nothing. The very nature of the proposed interengagement between the parts of my improved mechanism here to be described is such that these objections are automatically done away with, and effective provision is offered against rattling of the hood wall either along the hinge line adjacent the shoulder of the hood or against its bottom edge.

Broadly speaking, therefore, my invention contemplates the regulated application of a downward pressure upon and parallel with the plane of the side hood wall as a whole, at a level relatively near its upper or hinged edge, with the cooperating action of interengaging locating or anchorage members adjacent the level of its bottom edge. To effect this, the most feasible organization of parts seems to me to involve the positioning of fixed stops or projections on the inner face of the hood wall near its upper or hinged edge and the drawing against them of resiliently acting cams or projections carried on a longitudinally movable bar, positioned adjacent thereto and manually operable from inside the vehicle body. However, as an alternative thereto and functional equivalent thereof I shall show and describe other and alternative constructions in one of either the engageable stops positioned upon the inside of the hood wall are resilient or spring-held, while the manually actuatable draw bar is provided with fixed projections which will act upon the wall-supported elements with the same downwardly-pressing effect upon the hood wall.

Another modified construction, also to be described and illustrated, though, I believe, not of equal desirability, embodies a rockable or twistable bar provided with deformations which will swing downwardly through substantially a ninety degree arc, and then engaging against correspondingly positioned stops upon the hood wall, exert a similarly downward pressure upon the hood wall as a whole.

In the drawings:

Figure 1 is a perspective partly in phantom, showing my improved mechanism in installed position relatively to a motor vehicle hood wall, and bringing out as well the accessibility of its operating handle to the driver seated within the interior of the vehicle.

Figure 2 is a sectional end elevational view of the hood walls, showing my improved fastening means positioned thereon.

Figure 3 is a fragmentary perspective view taken from the inside of the hood-enclosed space, showing my preferred form of guiding and holding means for the bottom edge of the hood wall relatively to the adjacent fixed portion of the vehicle frame.

Figure 3ª is a slightly modified form of the guiding and holding means.

Figure 4 is a plan view partly in section, showing one of my preferred fastening devices in position relatively to the hood wall whose anchorage is desired.

Figure 5 is a fragmentary elevational view of one of my fastening devices positioned in operative relation to a hood wall, being taken from a position interiorly of the hood-enclosed space and looking outwardly.

Figure 6 is a fragmentary perspective taken from the inside of the hood-enclosed space and looking outwardly, showing one of my improved locking elements in the position occupied by it before its operative engagement with the hood wall projections has begun.

Figure 7 is a similar view, but showing the parts in operative engagement due to the actuated lengthwise movement of the draw bar.

Figure 8 is a largely sectional elevational view of the draw bar in relation to the hood wall, being taken along the line 8—8 of Figure 4.

Figures 9 and 10 are fragmentary elevational views, taken from within the hood-enclosed space showing further modifications in the form and arrangement of latching bar and bracket, being shown in said figures in engaged and disengaged positions respectively.

Figure 11 is a partly sectional view of this modification taken along the line 11—11 of Figure 9.

Figure 12 is a side elevational view, similarly taken from the inside of the hood-enclosed space, of a further modified form of locking elements, involving the flexed temporary deformation of a specially shaped resilient bar by the lengthwise drawing thereof through bracket stops on the hood wall.

Figure 13 is a plan view of the modification illustrated in Figure 12.

Figure 14 is an end elevational view of this modified form, taken along the line 14—14 of Figure 12.

Figure 15 is a perspective taken from within the hood-covered engine space illustrating a still further modified form of latch mechanism, wherein the downwardly pressing influence upon the hood wall is exerted through the medium of rotating a selectively deformed rod about its axis and downwardly upon projecting bracket pieces on the inner face of the hood wall.

Figure 16 is a sectional view of the modification illustrated in Figure 15, being taken along the line 16—16 thereof and looking in the direction of the arrows there shown.

Referring first to the form shown in Figures 1 to 8 inclusive, A represents one of the side hood walls of a motor vehicle which is hinged along its top edge, as at B, to generally sloping top walls, as B'. At C is shown the radiator and at D the dash board of the vehicle. Between these two latter points, comparatively near the level of the top edge of the hood wall, extends a bar E which when access to the engine is desired, as for repairs, may be entirely removed because of the fact that near its forward end it is slidably supported by the bracket F, while adjacent its rear end, near the dash D it is similarly slidably supported by the elongated bracket D'.

On the interior face of the hood wall A, near its bottom edge, are positioned a pair of inwardly-projecting clamp or catch pieces J, which are formed not merely with anchorage-engaging sections, as J' and J², but as well with an inwardly-extending part J³, slightly inclined from the horizontal, and preferably also with upwardly projecting ends J⁴ as clearly shown in Fig. 3ª, so that no matter how carelessly or inaccurately the hood wall may be lowered, one or the other of these described component sections of the catch J as a whole will, by riding upon and over the top of the anchorage piece I on the dash (or on the radiator shell) will guide the whole hood wall into the desired interlocking position of the catch J with respect thereto. Of course if the hood wall itself be of sufficiently rigid material, one of these catch or clamp pieces, preferably located near the middle of the bottom edge of the hood wall might be sufficient. In either event these catch pieces function cooperatively with the draw bar elements in accurately and firmly holding the hood wall A in its desired position, whichever form of draw bar be used.

At points along each draw bar E corresponding to the bracket projections G are located spring-held cam members, as K, each pivoted, as at L, to the bar E, and each being provided with a rearwardly projecting nose or point, as N, over which the angularly bentin end of the spring P engages. This latter section of the spring, as brought out in plan Figure 4, has one branch, as P', which yieldingly supports the end N of the cam piece K, and after being bent about the forward end thereof and passing through a corresponding pivot hole in the body of the bar E extends forwardly along the other side of the cam K and considerably beyond the same, this section of the spring being indicated by the character $P^2$. Its inbent end $P^3$ finds anchorage in a correspondingly positioned hole through the bar E. The tendency of this spring is for its constituent branches or parts P' and $P^2$ to lie in the same plane, as brought out in Figures 6 and 8. When, however, the retractile draw upon the bar E draws the sloping under surfaces of the pivoted cams K into engagement with the corresponding top surfaces of the brackets G, the parts of the spring P are forced to yield relatively to one another so that their respective branches P' and $P^2$ are placed in a condition of angular stress. But in such position they exert upon their respective cam members a degree of downward pressure sufficient to hold the inclined surfaces of the latter in such tight engagement against the projecting clips or brackets G that the entire hood wall to which they are fixedly connected is pressed downwardly against the chassis frame O to such a degree that rattling of all parts, which would otherwise take place due to road irregularities, is effectively prevented.

Since there are no holes or slots in the hood wall sufficiently near to these brackets G and the bar E when in engagement therewith as to prevent meddling access thereto from without, it is thus obvious that not only is the hood wall held efficiently and firmly against rattling, but as well that movement of the bar can only be effected from within the car thus forming an efficient anti-theft protection for the engine parts surrounded by the hood wall, and of course it will thus be obvious that while I have described two such pivoted cam or web members to be carried by the bar, with the corresponding member of fixed bracket pieces carried by the inner face of the hood wall, under any circumstances a single latch located more nearly centrally of the hood wall A could be used with fairly satisfactory results, and without departure from the fair spirit of my invention.

In Figures 9, 10 and 11 I have shown a modified or substitute construction for the cam-and-bracket form of hood wall locking members thus far described. In this form the draw bar E' has projecting from suitably located positions along its length fixed or integral cam projections $E^2$, which when the draw bar is actuated lengthwise of itself, engage with their inclined under surfaces the top surfaces of the inwardly projecting lower ends Y' of the spring-upheld brackets Y, which are positioned in corresponding locations on the inner face of the hood wall A'. The forced downward movement of these brackets Y, against the upward pressure of their respective springs $Y^2$ results in the exertion upon the hood wall A' of a similarly anchoring downward pressure as in the case of the form of latch mechanism first described.

In the modified form shown in Figures 12, 13 and 14, I have shown, at S, a selectively bent and moderately resilient rod designed for actuation lengthwise of itself through manual seizure of its handle S' in the same manner as the rod E and its attached parts already described. In this form selectively bent and correspondingly positioned parts of the rod S are adapted to slidably pass through apertures in the supporting bracket or shell pieces T and V, the manually induced lengthwise movement of the bar S drawing its correspondingly shouldered or bent portions, as $S^2$ and $S^3$, into positions of frictional engagement with or release from corresponding brackets, as T and V, carried on the inner face of the hood wall in the same manner as the brackets F already described. In this form the surfaces $S^2$ and $S^3$ correspond in function as regards the holding of the hood wall against rattling with the action of the spring-projected pivoted cam members K already described. The hooked forward end $S^4$ of the bar S prevents its undue withdrawal through the aperture in the bracket V while the engagement of the intermediate sloping section $S^5$ against the sides of the aperture in the support V is of such a frictional character that combined with the resiliency of the rods as a whole it serves to sufficiently hold the latter in the desired relation relatively to the brackets on the hood wall.

Of course in the case of my forms of locking bar heretofore described, when it is desired to raise the entire hood wall to a position over the engine, the clearance of the fixed bracket projections on the inner face of the hood wall from catching against the locking rod or bar can be relied upon, due to the fact that the whole half of the hinged hood wall structure is then swung about the central hinge W, resulting in that normally vertical part thereof whereon the fixed projections are located swinging about the line of the central hinge W and consequently initially outward and well clear of the locking bar.

In the further modified form of locking bar shown in Figures 15 and 16 the same general idea of exerting a downward pressure upon the vertically disposed hood wall through the medium of an actuated bar or rod located within the hood enclosure and near the top edge of its vertical wall, is adhered to. In this form brackets Z, very similar to the brackets G which were first discussed, are attached at desired intervals to the inner face of the hood wall $A^4$ near its top edge and upon the tops of these brackets are adapted to be rocked the correspondingly located deformed portions $E^6$ of the rotatable rod or shaft $E^5$ the twisting motion thus imparted thereto resulting in the exertion of the desired downward pressure upon the fixed brackets Z as in the case of the other forms of my improved device which have been described in earlier paragraphs hereof. The journaling or bearing support of the rotatable rod $E^5$ shown at $Z'$ and $Z^2$ may be made to fit sufficiently tightly about it that after its rotation in the manner described it will be frictionally held in the downwardly-pressing position then attained until releasingly rotated in the reverse direction for the purpose of disengaging the parts preliminary to raising the hood wall $A^4$.

What I claim is:

1. In a hood catch, in combination with a hood wall provided with interiorly projecting engagement brackets, a locking bar adapted to be manually actuated lengthwise of itself while terminally supported from the radiator frame and the dash of a vehicle, spring-actuated cam members supported by said locking bar in operative proximity to said engagement brackets on the hood wall and adapted when the bar is actuated lengthwise of itself to frictionally engage said brackets, thereby exercising a depressing action upon their supporting hood wall, and means carried adjacent the lower edge of the hood wall and adapted to engage correspondingly positioned projections from a fixed portion of the vehicle structure, whereby as the hood wall is lowered it is drawn by a transversely imposed strain into proper closed position while its described lowering movement is in progress.

2. In a hood catch, the combination, with an engine hood wall, of interiorly-facing projections selectively positioned thereon, certain thereof adjacent the bottom edge of said hood wall being adapted to be guidingly engaged by fixedly positioned projections complementarily located upon the vehicle frame, a limitedly slidable locking bar supported at its ends by fixed portions of the vehicle structure in operative proximity to certain other of said projections on said hood wall, pivoted wedging members supported by said locking bar in positions thereon operatively adjacent said last-mentioned projections on the hood wall and adapted to be thrown into operative engagement with the latter when the locking bar is actuated lengthwise of itself, and spring members operatively connected with said wedge members, adapted to resiliently press the latter downwardly against said hood wall projections, thereby effecting the resiliently effected downward movement of said hood wall in a direction generally coincident with the plane thereof and cooperatively with said first-mentioned projections thereon effecting its anchorage in desired firm position.

3. A hood catch, comprising, in combination with a hood wall provided with selectively positioned projecting elements on its interior face, complementarily located anchorage projections carried by fixed portions of the vehicle frame in position to be operatively engaged by certain of said projecting elements when the hood wall is lowered to position of closure over the engine of the vehicle, a longitudinally actuatable bar supported at its ends in fixed portions of the vehicle frame structure in proximity to certain others of said projecting elements on the hood wall, and spring-actuated means carried by said bar in position to operatively engage said last-named projecting elements on the hood wall when their supporting bar is moved longitudinally, whereby a downward pressure is resiliently exerted thereupon, thereby, cooperatively with the already-named elements adjacent the bottom edge of the hood wall the latter is firmly held in its desired closure position.

4. In combination with a hood wall hingedly supported along its upper edge and provided with guiding anchorage projections adjacent its bottom edge, adapted for engagement with correspondingly located projections carried by the vehicle frame, stop members projecting from the inner face of the hood wall adjacent its hinged upper edge, and a longitudinally movable draw bar supported at its ends operatively adjacent said stop members, spring means operatively associated with said draw bar, said draw bar being provided with projections corresponding in position with said stop members on the hood wall which as the bar is actuated are drawn into operative engagement with said stop members, whereby the force of said spring means exerts a downward pressure upon said hood wall.

5. In a hood catch, the combination, with an engine hood wall provided with interiorly facing bracket projections, of a manually actuatable rod extending generally parallel with the plane of said hood wall, said rod being provided with resiliently acting projecting portions adapted to be moved into downwardly pressing engagement with said bracket projections by the actuation of said rod, whereby the hood wall is held against displacement, and means carried by the vehicle frame whereby said rod when thus actuated is frictionally held against releasing movement of its resiliently acting projecting portions relatively to the bracket projections on the hood wall.

6. In combination with an engine hood wall provided with resiliently acting guide projections adjacent its lower edge, which projections are adapted to cooperate with correspondingly positioned contourings of a vehicle frame in guiding said hood wall when lowered into desired anchored position relatively to its interiorly located engine parts, bracket projections located on the interior face of said hood wall relatively near the upper hinged edge thereof, and a manually actuatable spring bar provided with bent portions in complementary location to said bracket projections on the hood wall, said bent portions movable into operative relation therewith upon the manual actuation of said rod, thereby forcing the hood wall downwardly, and cooperatively with said first named guide projections on its lower edge holding the hood wall firmly against displacement and rattling.

7. In an automobile engine hood, a hood catch comprising a member projecting inwardly from said hood, a bracket secured to said automobile, in cooperative relation with said member and frictionally engageable therewith, a lug member projecting inwardly from said hood and secured thereto, a locking bar manually movable from the operator's seat of the automobile, resilient means operatively associated with said bar, said resilient means co-acting with said lug when said bar is moved to locking position resiliently to draw said first mentioned member into engagement with said bracket and securely lock said hood in position.

8. In an automobile hood, a hood catch comprising a member projecting inwardly from said hood, a bracket mounted on said automobile in cooperative relationship with said member, said member being engageable with said bracket when said hood is closed, a lug member projecting inwardly from said hood and secured thereto, an operating element manually movable from the operator's seat of the automobile, and means co-acting with said lug operable upon movement of said operating element to draw said first mentioned member downwardly and inwardly into engagement with said bracket securely to lock said hood in position.

9. In an automobile hood, a hood catch comprising a locking bar operable from the driver's seat of the automobile, a lug member mounted on said hood, a spring operatively associated with said lug member and tending to draw said lug member upwardly, a depending cam member on said bar, said depending cam member co-acting with said lug when said bar is moved to locking position to compress said spring and cause a downward and inward force to be exerted upon said hood.

10. In an automobile hood, a hood catch comprising a bar operable from the driver's seat of the automobile, a lug member secured to said hood, said lug member having a resilient mounting and said bar having a depending portion whereby upon movement of said bar said depending portion co-acts with said lug to draw said hood downwardly and inwardly.

11. In an automobile engine hood, in combination a hood catch comprising a member projecting inwardly from said hood, a bracket secured to said automobile in cooperative relation with said member and frictionally engageable therewith, a lug member projecting inwardly from said hood and secured thereto, a resilient mounting for said lug member, a locking bar operable from the driver's seat of the automobile having a depending portion, said depending portion co-acting with said lug when said bar is moved to locking position to compress said spring and exert a downward force on said hood whereby said first mentioned member is securely drawn into engagement with said bracket and said hood is securely locked in position.

12. In an automobile engine hood having a hood wall, lug members secured to said hood wall and projecting inwardly therefrom, a resilient locking element having bent portions, said element being manually movable from the operator's seat of the automobile and said bent portions of said resilient element coacting with said members when said element is moved to locking position, said hood wall being drawn downwardly and inwardly by the spring effect of said resilient element.

13. In an automobile engine hood having a hood wall, lug members secured to said hood wall and projecting inwardly therefrom, a resilient locking bar manually movable from the operator's seat of the automobile, said resilient bar having bent portions adapted to co-act with said lug members upon movement of said bar to locking position, means on said hood wall and means on said automobile arranged frictionally to engage with each other when said hood wall is drawn downwardly by the spring effect of said resilient bar.

In testimony whereof I sign this specification.

WILLIAM R. WILEY.